United States Patent
Findlay et al.

(10) Patent No.: US 7,961,969 B2
(45) Date of Patent: Jun. 14, 2011

(54) ARTIFACT REMOVAL FROM PHASE ENCODED IMAGES

(75) Inventors: Ewan Findlay, Lothian (GB); Andrew Harvey, Glasgow (GB); Bertrand Lucotte, Edinburgh (GB); Gonzalo Muyo, Edinburgh (GB)

(73) Assignee: STMicroelectronics (Research & Development) Ltd, Marlow, Buckinghamshire (GB)

( * ) Notice: Subject to any disclaimer, the term of this patent is extended or adjusted under 35 U.S.C. 154(b) by 875 days.

(21) Appl. No.: 11/942,810

(22) Filed: Nov. 20, 2007

(65) Prior Publication Data

US 2008/0131018 A1 Jun. 5, 2008

(30) Foreign Application Priority Data

Nov. 21, 2006 (EP) .................................... 06270095

(51) Int. Cl.
*G06K 9/40* (2006.01)

(52) U.S. Cl. ........ 382/255; 382/260; 382/274; 382/275; 358/3.26; 358/3.27; 358/463

(58) Field of Classification Search .................. 382/260, 382/274, 275, 282
See application file for complete search history.

(56) References Cited

U.S. PATENT DOCUMENTS

| | | | |
|---|---|---|---|
| 5,748,371 A | 5/1998 | Cathey, Jr. et al. | |
| 6,489,998 B1 * | 12/2002 | Thompson et al. | 348/452 |
| 6,498,946 B1 * | 12/2002 | Foo et al. | 600/410 |
| 6,911,638 B2 | 6/2005 | Dowski, Jr. et al. | |
| 7,412,277 B1 * | 8/2008 | Saranathan et al. | 600/413 |
| 7,545,155 B2 * | 6/2009 | Goeke | 324/688 |
| 2003/0127584 A1 | 7/2003 | Dowski et al. | |
| 2005/0204329 A1 | 9/2005 | Pauca et al. | |
| 2005/0259889 A1 | 11/2005 | Ferrari et al. | |
| 2008/0285868 A1 | 11/2008 | Rai et al. | |

FOREIGN PATENT DOCUMENTS

| | | |
|---|---|---|
| EP | 1 926 047 | 5/2008 |
| JP | 1-191112 | 8/1989 |

OTHER PUBLICATIONS

Punchihewa. "A Random Colour Test Pattern Generator for Objective Colour Artefact Assessment in Benchmarking Colour Images Codecs," Information and Automation, ICIA, Dec. 2006, pp. 307-312.

Van Der Gracht, et al. "Iterative Restoration of Wavefront Coded Imagery for Focus Invariance," Date: Unknown, 7 pages.

Prasad, et al., "Pupil-phase optimization for extended-focus, aberration-corrected imaging systems," Advanced Signal Processing Algorithms, Architectures, and Implementations XIV; Edited by Luk, Franklin T., Proceedings of the SPIE, vol. 5559, 2004, pp. 335-345, XP002440110.

(Continued)

*Primary Examiner* — Yosef Kassa
(74) *Attorney, Agent, or Firm* — Gardere Wynne & Sewell LLP; Andre M. Szuwalski

(57) ABSTRACT

PSF coding has become well known in recent years. Although it enables significant increases in the depth of field, defocus introduces artifacts in images that are a major detraction from the final image quality. A method is described that enables the deduction or defocus and consequently the removal of these artifacts. The principle of the disclosed techniques involves iteratively adjusting the restoration algorithm according to a chosen image metric and choosing the defocus parameter that yields the image the lowest level of artifact.

25 Claims, 13 Drawing Sheets

OTHER PUBLICATIONS

Prasad, et al., "Engineering the Pupil Phase to Improve Image Quality," Proceedings of SPIE vol. 5108 (2003) © 2003 SPIE-0277-786X/03.

Dowski, et al., "Extended depth of field through wave-front coding," Applied Optics, OSA, Optical Society of Ameria, Washington, DC, US, vol. 34, No. 11, Apr. 10, 1995, pp. 1859-1866; XP000497512; ISSN: 0003-6935.

Muyo, et al., "Decomposition of the optical transfer function: wavefront coding imaging systems," © 2005 Optical Society of America, Optics Letters, vol. 30, No. 20, Oct. 15, 2005; 0146-9592/05/202715-3.

European Search Report and Written Opinion, EP 06 27 0095, Jun. 29, 2007.

Kautsky, J., "A new wavelet-based measure of image focus", Pattern Recognition Letters 23 (2002) pp. 1785-1794.

Johnstone, I. M., "Wavelet Threshold Estimators for Data with Correlated Noise", J. R. Statist. Soc. B (1997), 59, No. 2, pp. 319-351.

* cited by examiner $w20=3\lambda$, $w_{20\,kernel}=0\lambda$ $w20=3\lambda$, $w_{20\,kernel}=1\lambda$ $w20=3\lambda$, $w_{20\,kernel}=2\lambda$ $w20=3\lambda$, $w_{20\,kernel}=3\lambda$ $w20=3\lambda$, $w_{20\,kernel}=4\lambda$ $w20=3\lambda$, $w_{20\,kernel}=5\lambda$

ARTIFACT REMOVAL FROM PHASE ENCODED IMAGES

PRIORITY CLAIM

The present application claims priority from European Application for Patent No. 06270095.0 of the same title filed Nov. 26, 2006, the disclosure of which is hereby incorporated by reference.

BACKGROUND

1. Technical Field of the Invention

The present invention relates to the removal of image artifacts, in particular to the removal of artifacts from phase encoded images.

2. Description of Related Art

It has been known in many different fields to phase-encode image data. One such field is the recently developed wavefront coding (WFC) technique, developed to increase the depth of field of incoherent optical systems and described in E. Dowski and T. W. Cathey, "Extended depth of field through wavefront coding," Appl. Opt. 34, 1859-1866 (1995), the disclosure of which is hereby incorporated by reference.

In this approach, pupil-plane masks are designed to alter, that is to code, the transmitted incoherent wavefront so that the point-spread function (PSF) is almost constant near the focal plane and is highly extended in comparison with the conventional Airy pattern. As a consequence the wavefront coded image is distorted and can be accurately restored with digital processing for a wide range of defocus values. By jointly optimizing the optical coding and digital decoding, it is possible to achieve tolerance to defocus which could not be attained by traditional imaging systems while maintaining their diffraction-limited resolution.

The phase encoding principle is illustrated in FIG. 1. An optical system 10 comprises lenses and/or other optical elements and a phase encoding means 12 which is near to or in the pupil plane that changes the phase of the radiation that is incident upon it. The phase encoding means 12 can take the form of a phase mask. Due to the phase mask, the optical system 10 produces a phase encoded image 14 of an object 16, which is detected by image sensing means 18. The phase encoded image 14 appears blurred when viewed. Processing means 20 then applies a reconstruction algorithm to remove the phase encoding to produce a restored image 22, which appears in focus, that is, sharp, when viewed. Because the variation in the point spread function is predetermined by the choice of mask, the reconstruction algorithm can be written to reverse the blurring effects of the phase encoding means 12.

Various methods have been used for the design of the phase mask, for both square and circular apertures. Early design of phase masks was carried out in the frequency domain by the use of the ambiguity function (AF). The AF combined with the stationary phase approximation indicates that the ideal phase mask for extending the depth of field must be anti-symmetric and have a linear separable cubic form:

$$f(x,y) = \alpha(x^3 + y^3)$$

A cubic phase mask 24 of this type is illustrated in FIG. 2. The strength of the phase mask, $\alpha$, sets the maximum wavefront deviation and yields the amount of defocus invariance in the decoded image.

In the last five years, pupil plane encoding has been extended to include more general phase functions; phase masks have been successfully designed in the spatial domain in which the point spread function (PSF), Strehl ratio and Fisher information metrics are solved to be invariant to defocus. A technique called Pupil Plane Engineering has been developed by Prasad et al, and is described in S. Prasad, T. Torgersen, V. P. Pauca, R. Plemmons, J. van der Gracht, "Engineering the Pupil Phase to Improve Image Quality," in Proceedings of the SPIE, Vol. 5108 Visual Information Processing XII, edited by Z. Rahman, R. Schowengrdt, and S. Reichenbach (SPIE, Wellingham, Wash., 2003), pp. 1-12, the disclosure of which is hereby incorporated by reference. This approach generalizes the shape of the mask to include higher polynomial orders and is optimized by means of Fisher information metrics. The derived PPE mask 26, see FIG. 2, has an anti-symmetric phase shape (like a petal) and is given by:

$$\theta(x,y) = \beta(x^3 + y^3) + \gamma(x^2 y + xy^2)$$

where $|x|<1$, $|y|<1$ are normalized co-ordinates and $\beta$ and $\gamma$ are real variables that control the optical path difference (OPD) or amount of coding introduced in the transmitted wavefront of the optical system. We will denote by $\alpha$ the OPD introduced by a phase mask. For the 2D cubic phase mask, the maximum the peak-to-valley OPD is given by $4\alpha$.

In addition, radially symmetric quartic and logarithmic phase masks, which can be manufactured using traditional techniques, also enable aberration mitigation. The performance attained by these kinds of phase mask cannot equal that of anti-symmetric masks, but are suitable under modest amounts of aberrations and can be used without digital signal processing.

Phase coding and other phase perturbation techniques can greatly increase the depth of field which is useful for a wide range of applications and environments. However, this advantage is achieved at the expense of noise amplification during the decoding process. This effect increases with the strength of phase mask that is applied. Since the restored image suffers from a reduced signal-to-noise ratio, a trade-off between the signal-to-noise ratio of the restored image and its depth of field is required. Therefore, there is a noise cost that is inherent to the wavefront coding itself.

Furthermore, the PSF of such optical systems is usually considered to be shape invariant with defocus near the focal plane, so that the restoration of objects that belong to a specific range of defocus can be performed with a single kernel. However, there are in fact significant phase variations and amplitude variations of the Optical Transfer Function with defocus which cannot be compensated for by restoration using a single kernel. These variations in the OTF result in artifacts being embedded in the restored images which degrade the quality of the restored image.

These defects are generally poorly described in the literature, as they are not important in lower quality image systems. However, it is known how to remove these artifacts with specialized nonlinear filters. If the phase encoding means is rectangularly separable, the operation of the filters is also rectangularly separable so that computational speed can be increased through parallel processing.

Also, an approximate expression of the OTF of an optical system including a cubic phase mask is given in G. Muyo and A. Harvey, "Decomposition of the optical transfer function: wavefront coding imaging systems," Opt. Letters, 2005, 2715-2717, the disclosure of which is hereby incorporated by reference. This paper shows how the decomposition of the optical transfer function (OTF) of a wavefront coding system can be described as a generalized Cornu spiral (GCS), the geometry of which can be used to estimate an approximation of the value for the phase and magnitude of the optical transfer function (OTF), the maximum value of a defocus coefficient for which the OTF can be considered to be approximately constant, the magnitude of the amplitude modulation of the MTF within the region of invariance, and the magnitude of phase modulation introduced. These features present in the OTF's of wavefront coded systems are explained analytically and so the possibility of simple calibration was introduced, that is, estimating the discrepancy between the coding and decoding kernels.

However, none of these methods provide for removal of artifacts from a restored phase encoded image.

SUMMARY

According to a first aspect there is provided a method of imaging an object, comprising the steps of: introducing a phase perturbation to get a phase-encoded image; recording the phase encoded image data; performing a reconstruction algorithm on the recorded phase encoded image data to obtain an image in which the effects of the phase perturbation are removed. The method further includes the steps of: estimating a degree of defocus in the obtained image; adjusting the reconstruction algorithm to take account of the estimated degree of defocus; and performing the adjusted reconstruction algorithm to obtain a restored image.

Preferably, the step of adjusting the reconstruction algorithm comprises: measuring an image metric of the obtained image; and using the image metric to estimate a new defocus parameter for the image reconstruction algorithm.

Preferably, the step of using the image metric to estimate a new defocus parameter comprises performing an iterative analysis of images reconstructed with various defocus parameters, and choosing the defocus parameter that optimizes the image metric for obtaining the restored image.

Preferably, the image metric is contrast.

Preferably, the degree of defocus is chosen as the value that maximizes the variance of the image contrast.

Preferably, after the step of recording the phase encoded image data and prior to the subsequent proceeding steps, an image segmentation step is performed and the restored image for each segmented image feature is obtained, each of which are then combined to form the composite restored image.

Preferably, the step of introducing a phase perturbation is performed with a phase mask that yields a focus invariant point-spread function.

Preferably, the phase mask is a cubic or petal phase mask.

It is to be understood that the phase mask can be an infinite number of different shapes. When considering the special cases of cubic or petal phase masks as mentioned here and elsewhere in the description it is to be understood that the terms are intended to encompass deviations from the usual shapes as illustrated in the FIGURES, so long as an overall characteristic cubic or petal form is retained in a general sense. That is, changes can be made to the usual cubic and petal shapes that act only to fine tune the effects of the masks rather than to substantially alter their characteristics, and changes of this type are intended to be included in the terms "cubic" and "petal" phase masks in the context of the present description at all points.

Preferably, the step of introducing a phase perturbation comprises a wavefront coding step.

Preferably, the step of recording the phase encoded image data comprises detecting the image with a digital image sensor.

According to a second aspect there is provided a method of removing artifacts from a reconstructed phase encoded image, comprising the steps of: estimating a degree of defocus in the reconstructed phase encoded image; adjusting the image reconstruction algorithm that has been used to reconstruct the phase encoded image to take account of the estimated degree of defocus; and performing the adjusted reconstruction algorithm to obtain a restored image.

Preferably, the step of adjusting the reconstruction algorithm comprises: measuring an image metric of the reconstructed phase encoded image; and using the image metric to estimate a new defocus parameter for the image reconstruction algorithm.

Preferably, the step of using the image metric to estimate a new defocus parameter comprises performing an iterative analysis of images reconstructed with various defocus parameters, and choosing the defocus parameter that optimizes the image metric for obtaining the restored image.

Preferably, the image metric is contrast.

Preferably, the degree of defocus is chosen as the value that maximizes the variance of the image contrast.

According to a third aspect there is provided signal processing means for the performance of an image reconstruction algorithm, said means estimating a degree of defocus in a reconstructed phase encoded image; adjusting the image reconstruction algorithm that has been used to reconstruct the phase encoded image to take account of the estimated degree of defocus; and performing the adjusted reconstruction algorithm to obtain a restored image.

Preferably, the signal processing means further operates for measuring an image metric of the obtained image; and using the image metric to estimate a new defocus parameter for the image reconstruction algorithm.

Preferably, the signal processing means further operates for performing an iterative analysis of images reconstructed with various defocus parameters, and choosing the defocus parameter that optimizes the image metric for obtaining the restored image.

Preferably, the image metric is contrast.

Preferably, the signal processing means is adapted such that the degree of defocus is chosen as the value that maximizes the variance of the image contrast.

Preferably, the signal processing means is formed as an integrated circuit or part thereof.

Preferably, the signal processing means is a computer program product executable on a computer for the performance of an image reconstruction algorithm.

According to a fourth aspect there is provided an imaging system comprising: an optical system with phase encoding means; an image sensing means arranged to record the phase encoded image data; and signal processing means according to the third aspect for performing an image reconstruction algorithm to obtain an image in which the effects of the phase perturbation are removed.

Preferably, said phase encoding means comprises a phase mask that yields a focus invariant point-spread function.

Preferably, the phase mask is a cubic or petal phase mask. The scope of these terms is discussed above.

Preferably, the phase encoding means comprises wavefront coding means.

Preferably, the image sensing means comprises a digital image sensor.

Preferably, the imaging system comprises memory means for storing the estimated degree of defocus.

Preferably, the memory means comprises a non-volatile memory portion formed on a coprocessor or on an image sensing integrated circuit.

According to a fifth aspect there is provided a mobile device comprising an imaging system according to the fourth aspect.

The mobile device is preferably one of a mobile telephone, laptop computer, webcam, digital still camera, camcorder, optical mouse or barcode reader.

BRIEF DESCRIPTION OF THE DRAWINGS

The present invention will now be described, by way of example only, with reference to the accompanying drawings, in which.

DETAILED DESCRIPTION OF THE DRAWINGS

Figure 2:
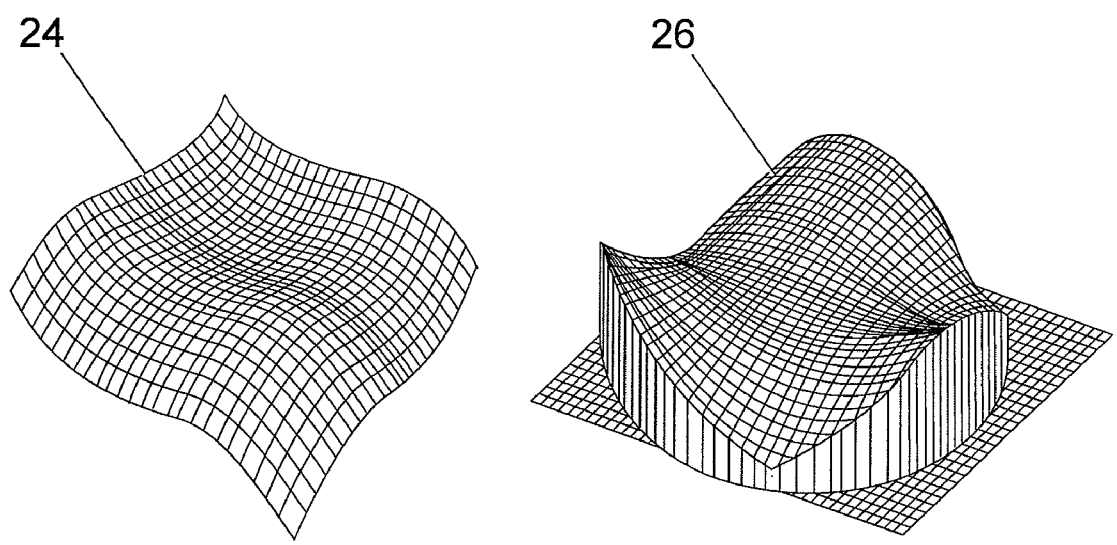
FIG. 2 shows cubic and petal phase masks for use with imaging system of FIG. 1.

FIG. 2 shows that both the cubic and PPE phase masks are anti-symmetric. The OTF of such optical systems is complex and varies significantly with the defocus parameter $W_{20}$. The defocus aberration coefficient $W_{20}$ is well known and takes the form:

$$W_{20} = \frac{\delta z}{8 \cdot (f/\#)^2},$$

where $\delta z$ is the shift in the lens to image distance from nominal and f/# is the f-number of the lens. In the case of rotationally symmetric phase masks the OTF are always real. The inventors have realized that the main cause of the image artifacts in a reconstructed phase encoded image is the discrepancy between the phase of the coding OTF and the phase of the decoding filter.

Figure 3A:
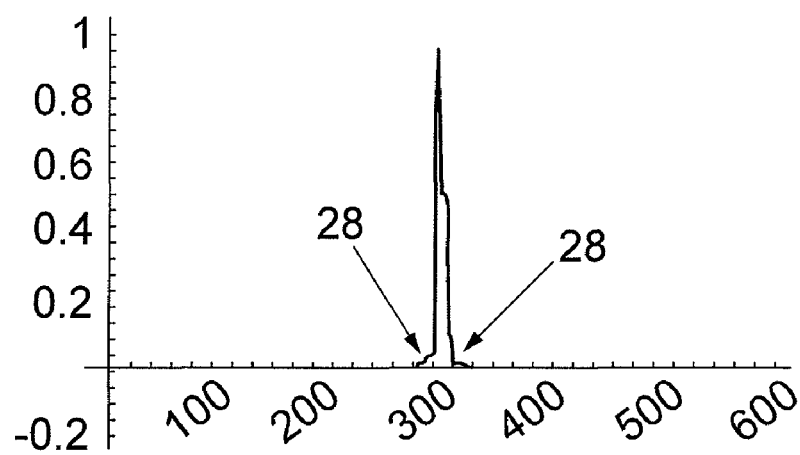
FIG. 3 shows the variation with defocus of the point spread function of the imaging system of FIG. 1 used with the cubic phase mask of FIG. 2, that is subsequent to deconvolution using the in-focus PSF.
Figure 3B:
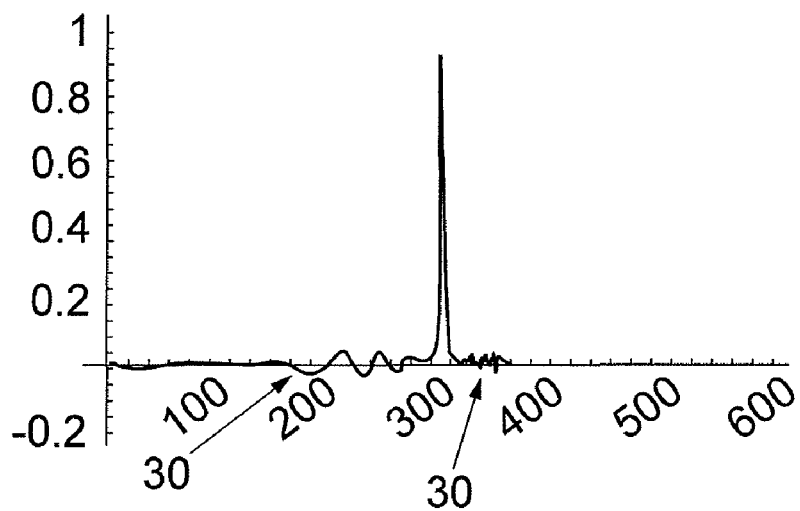
Figure 3C:
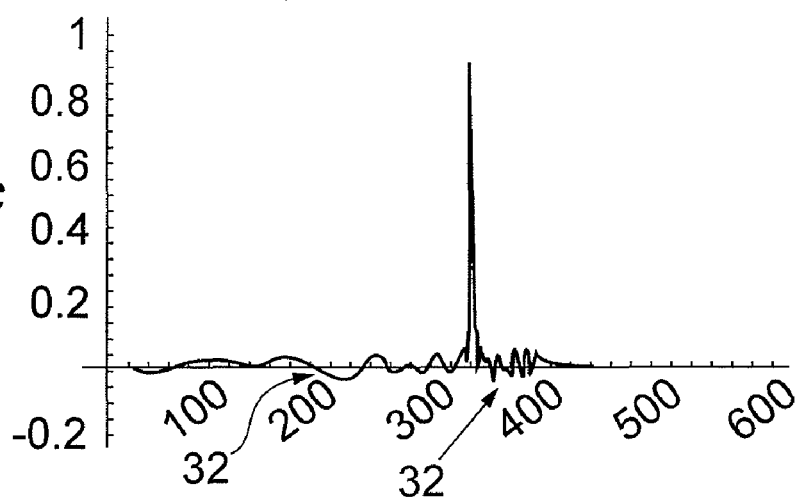

FIGS. 3a-3c show the PSF after restoration (with a signal magnitude in arbitrary units plotted on the y-axis versus spatial position on the x-axis) of a hybrid optical/digital system including a cubic phase mask for various values of defocus, assuming a phase mask strength of 5λ. FIG. 3a shows the PSF for zero defocus ($W_{20}$=0λ), in which it can be seen that the point remains well defined, having the characteristics Sinc² form of a uniformly illuminated aperture. FIG. 3b shows the PSF for a mild defocus ($W_{20}$=λ), where the phase variation of the OTF has resulted in sidelobe levels of increased magnitude and extent. FIG. 3c shows the PSF for a severe defocus ($W_{20}$=2λ) with further increased sidelobe effects at low spatial frequencies 32.

Figure 4:
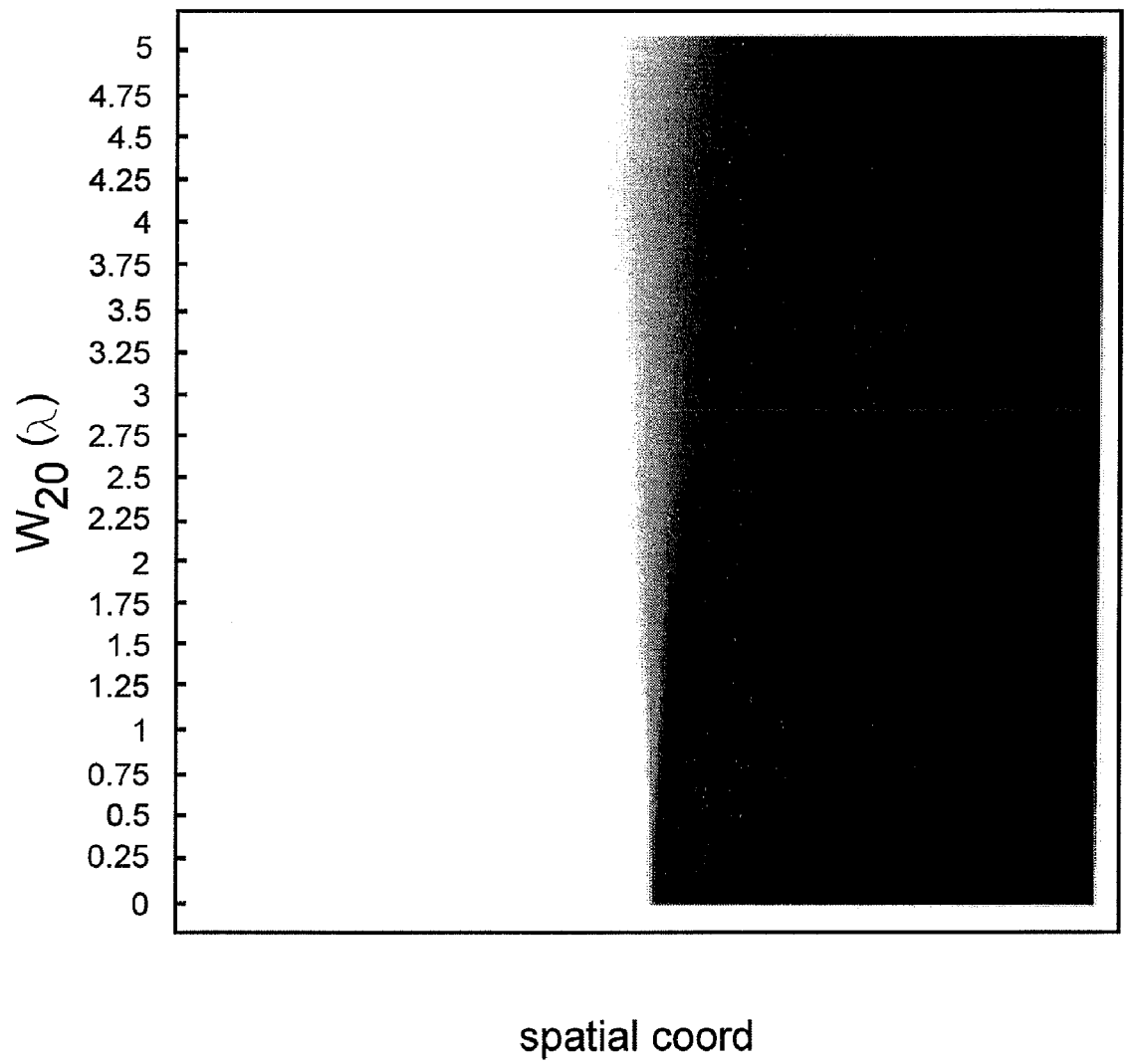
FIG. 4 shows a line-transfer function of a conventional optical system as a function of a defocus parameter $W_{20}$.

This variation of PSF with defocus is responsible for varying artifacts in the restored images depending on the defocus of the object. FIG. 4 shows how an edge is imaged with a conventional optical system for different values of defocus, plotted against the y-axis. It can be seen that the boundary between the light and dark regions is sharp at $W_{20}$=0, but that it gets progressively more blurred as $W_{20}$ increases.

Figure 5:
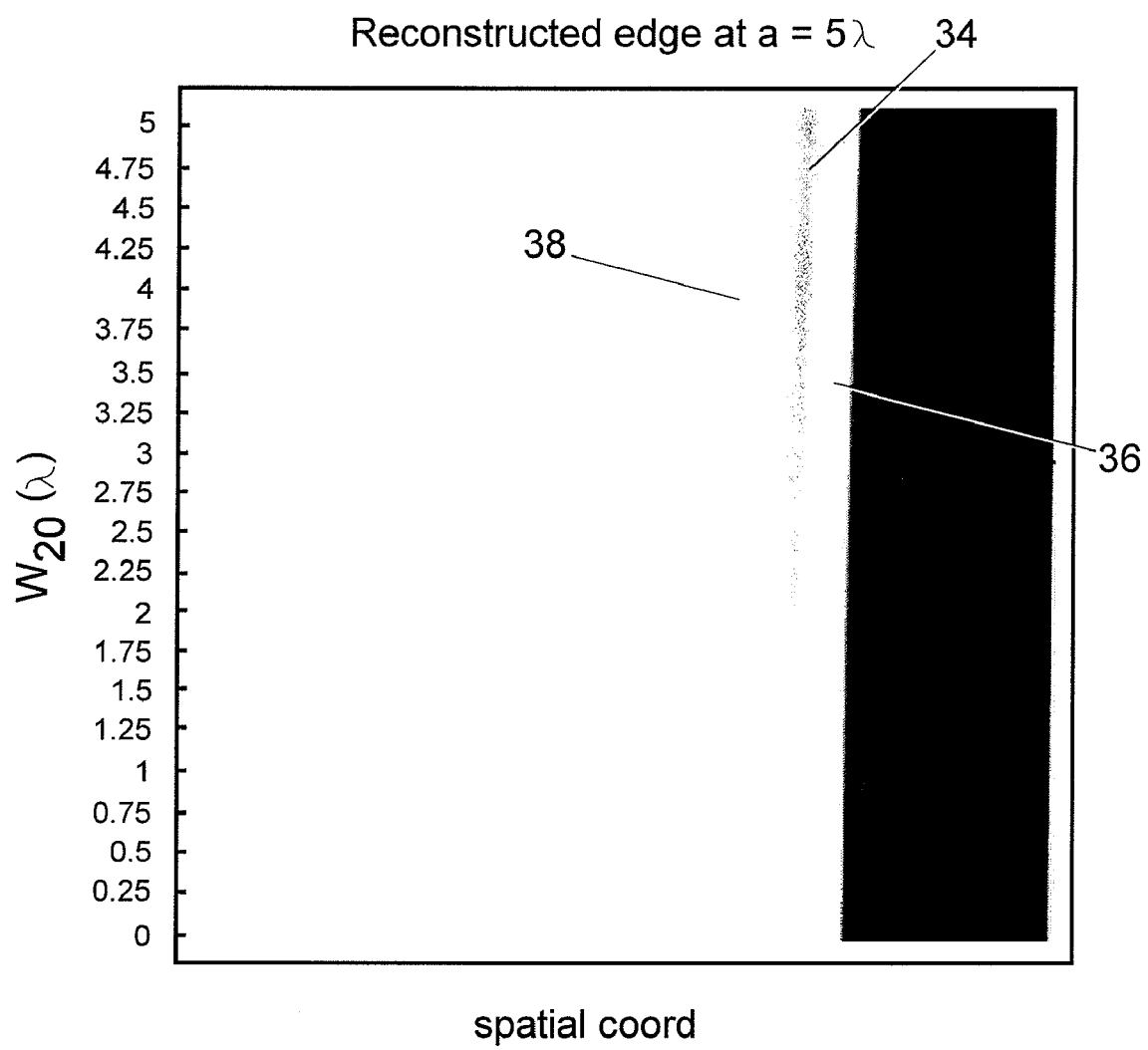
FIG. 5 shows a line-transfer function as a function of a defocus $W_{20}$ for the imaging system of FIG. 1.

FIG. 5 illustrates how the same edge is imaged with a wavefront coded imaging system. It can be seen that the boundary between the light and dark regions is much sharper through the range of defocus values, as expected. However, FIG. 5 also shows that there are restoration artifacts, in the form of ripples 34, 36, 38, that vary with the defocus parameter $W_{20}$. Therefore, one can interpret the artifacts in the restored image as a defocus signature.

Figure 6:
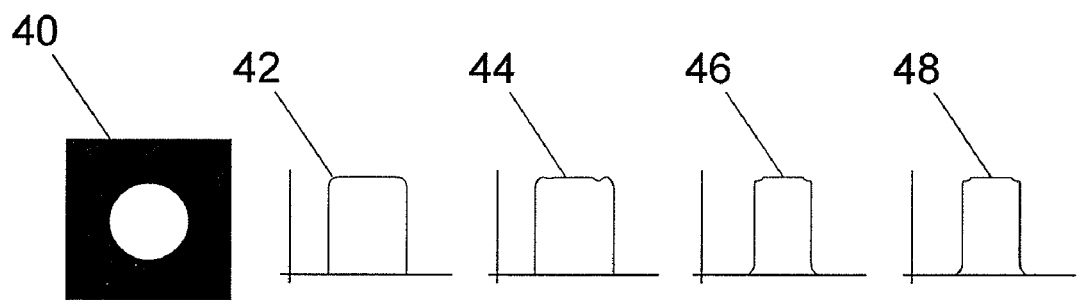
FIG. 6 shows restoration artifacts after deconvolution of a high contrast circular target with cubic and petal phase masks.
Figure 6:
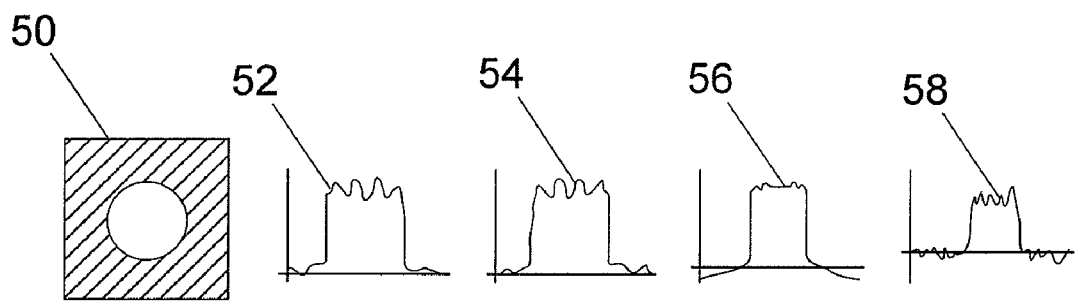
Figure 6:
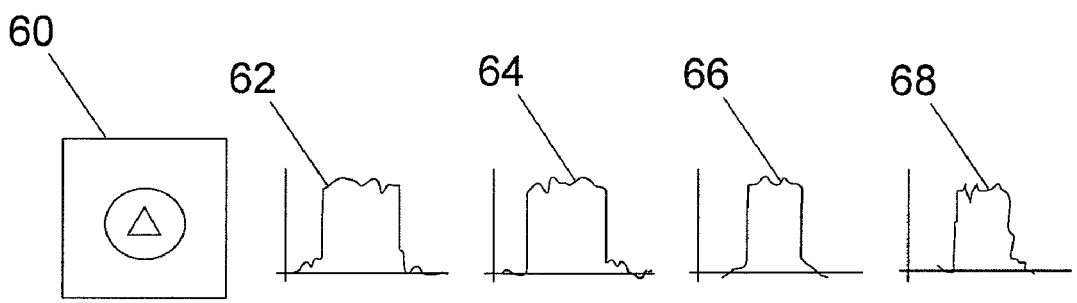

This is illustrated again in FIG. 6, in which the strength of the phase mask is again assumed to be α=5λ. The top row shows a high contrast circular target 40, together with various sections through the target at zero misfocus, including a horizontal section 42 taken along a horizontal axis, a vertical section 44 taken along a vertical axis, a first diagonal section 46 taken along a diagonal running from the bottom left corner to the top right corner, and a second diagonal section 48 taken along a diagonal running from the top left corner to the bottom right corner, where each of the above axes and diagonals are the lines passing through the center of the target 40 as illustrated. The middle row illustrates the blurred image 50 formed with a cubic phase mask, of the type illustrated in FIG. 2 that introduces a defocus of 4λ, and the sections 52-58 of the reconstructed image, along the same respective axes or diagonals as the sections 42-48 illustrated directly above them. The bottom row illustrates the blurred image 60 formed with a petal phase mask with the same peak-to-valley OPD as the cubic phase mask, of the type illustrated in FIG. 2 that introduces a defocus of 4λ, and the section 62-68 of the reconstructed image, along the same respective axes or diagonals as the section 42-48 as illustrated above them in the top row. The artifacts in the sections 52-58 and 62-68 can be seen as the variations from the ideal sections 42-48, and as discussed, these artifacts arise from the phase and amplitude disparities between the optical convolution and digital deconvolution kernels.

Such artifacts may be mitigated if the restoration algorithm kernel matched the PSF exactly. In essence the artifact is a manifestation of the phase mismatch between the actual PSF and that expected by the decoding kernel. The phase mismatch is a result of the defocus of the camera system, which may be dependent on the position of the object with respect to the focused distance of the camera in object space. The decoding kernel may be set for any defocus value if the PSF at that defocus is known. Thus if the phase mismatch is estimated from the artifact seen for a nominal defocus an alternative kernel can be employed that matched the defocus of the image and nullify the artifact.

One can then remove the artifacts present in the restored image of an object that originally has a defocus $W_{20}$, by deducing the optical convolution kernel and then decoding the detected image with the appropriate digital kernel. Thus, removing the artifacts becomes a matter of estimating the defocus present in the image. This estimation can be achieved iteratively with various restoration kernels based on a given metric of the degree of artifacts present in the recovered image. The artifact removal becomes an optimization problem for the given metric. One possible metric is the image contrast, which will be described in more detail below. Others include but are not limited to sharpness, entropy, energy. The principle for all of these is iterative optimization of the metric with defocus as the free variable.

Image segmentation can also be used to deal with images that comprise several features (or objects) with different degrees of defocus. Image segmentation algorithms are well known per se, and so will not be described in detail herein. In the case of a segmented image, the iterative restoration is applied to each segmented feature or object separately.

Figure 1:
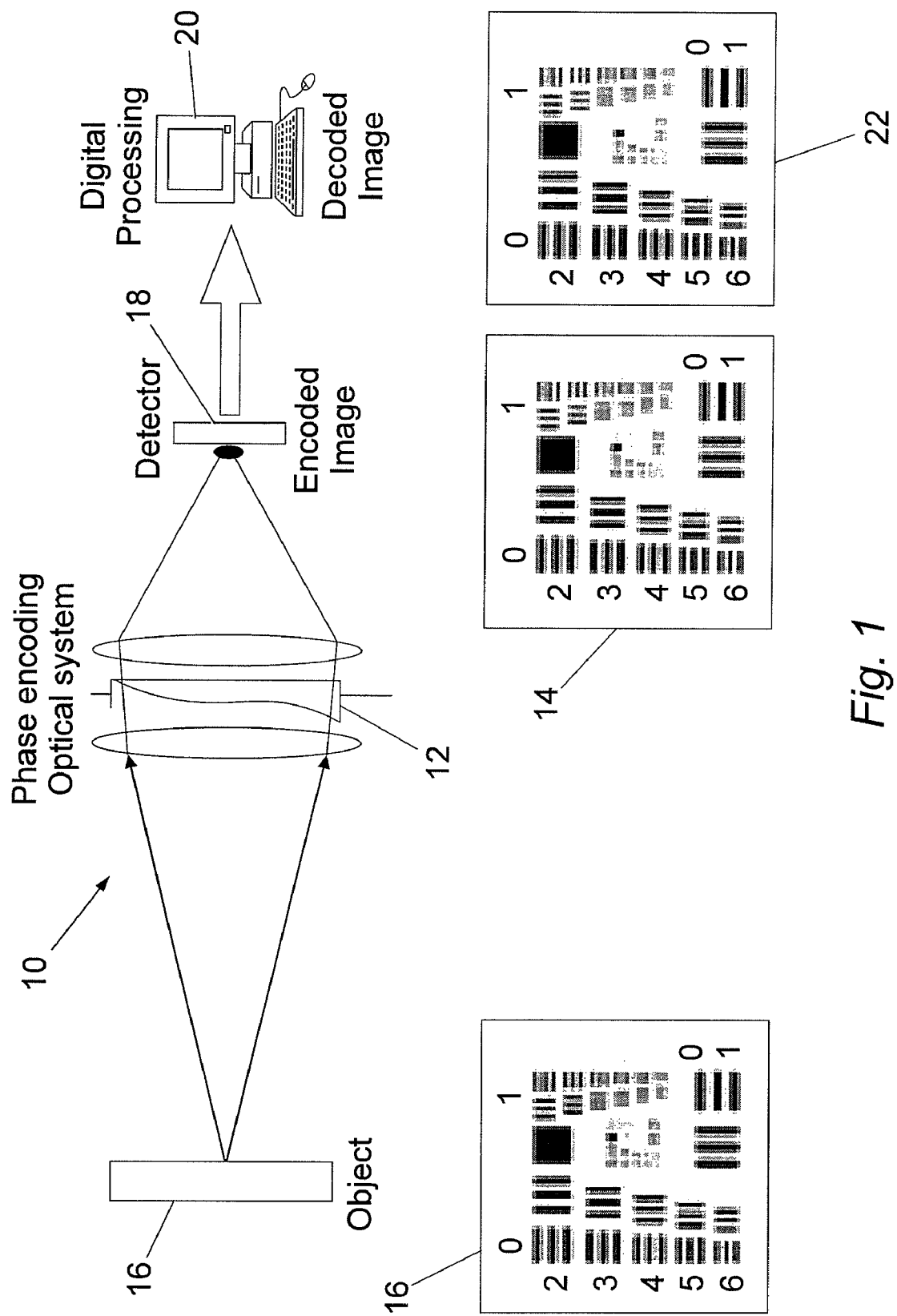
FIG. 1 shows a known phase encoding imaging system.
Figure 7:
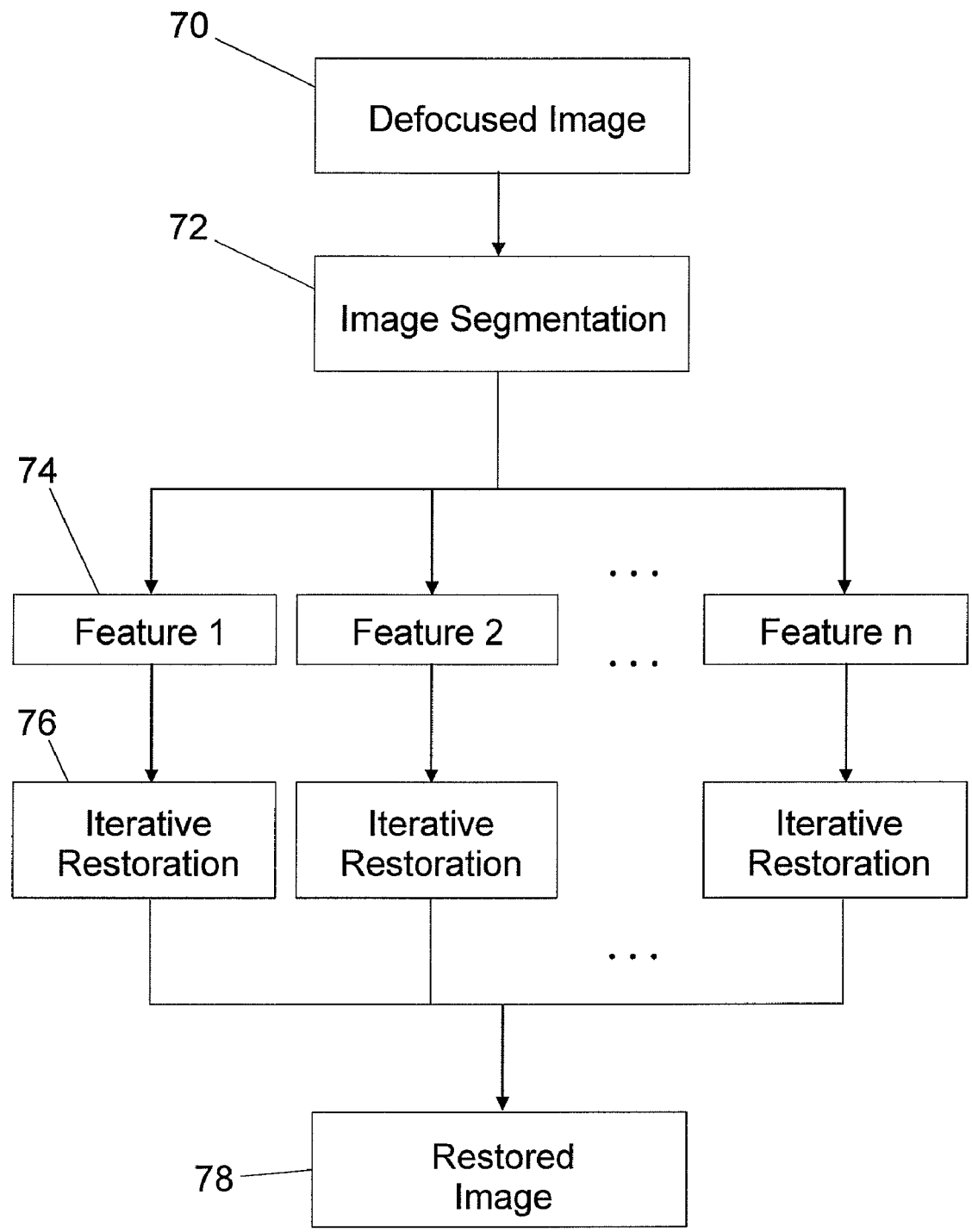
FIG. 7 illustrates an image restoration process according to a first embodiment.

The restoration algorithm follows the process depicted in FIGS. 7 and 8. A defocused image 70 corresponds to the phase encoded (blurred) image 14 of the standard set up illustrated in FIG. 1. The defocused image 70 is operated on by an image segmentation algorithm 72 which detects and defines a plurality of features 74 within the image. Each of the objects 74 is then operated on by an iterative restoration process 76 before being combined to form a new restored image 78. It will be appreciated that the image segmentation step 72 is optional, and in the event of its omission the defocused image 70 would be directly operated on by the iterative restoration process 74 to render the new restored image 78.

Figure 8A:
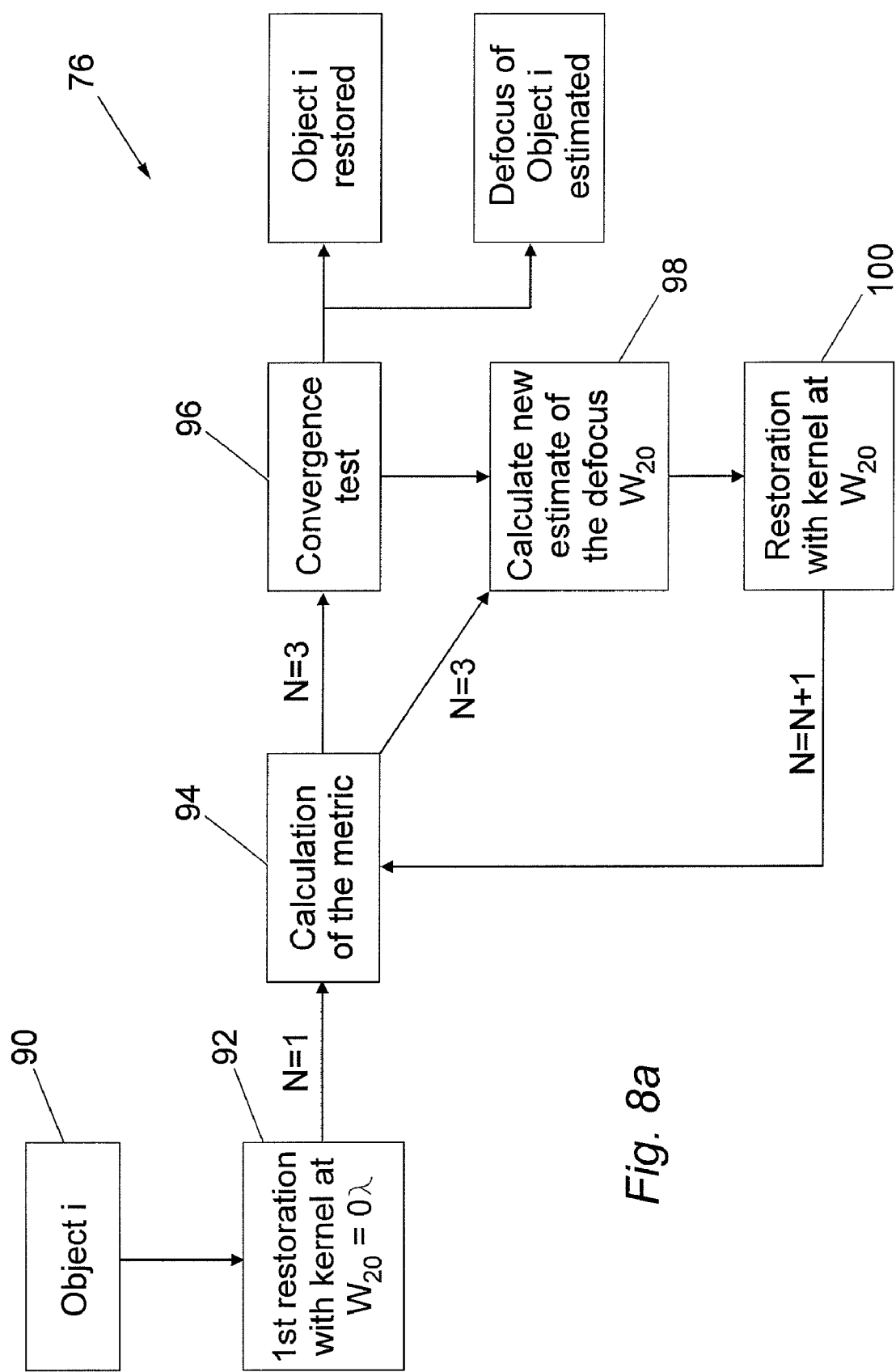
FIG. 8 illustrates the iterative restoration step of FIG. 7.
Figure 8B:
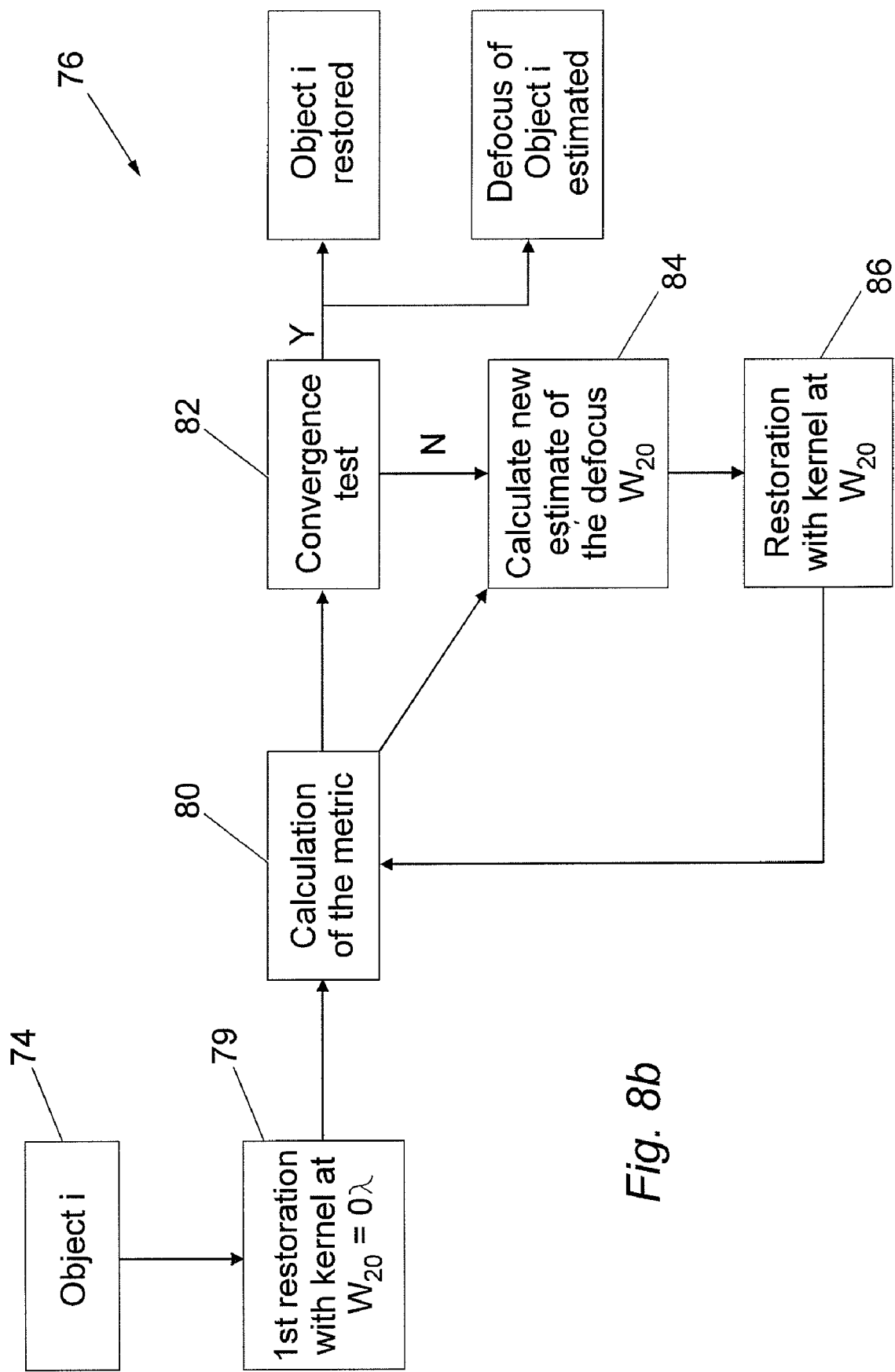

Examples of the operation of the iterative restoration process 76 are shown in FIGS. 8a and 8b.

As shown in FIG. 8a, after object i 90 is obtained, a first restoration 92 is carried out with a kernel at $W_{20}=0$. The image metric is then calculated (94) a number of times before a convergence test is carried out (96) to determine for which value of $W_{20}$ the image metric is optimized. In the embodiment of FIG. 8a, convergence depends on the turning point in a plot of a graph of the metric against $W_{20}$, and so the metric must be measured for at least three values of $W_{20}$ before convergence can be assumed. Thus at the first calculation of the metric (94) a counter is set to zero, and a new estimate of the defocus parameter is calculated for the first given value of $W_{20}$. A restoration 100 is then carried out with the new kernel, and the counter is incremented so that the metric can be recalculated (94). This cycle repeats until the counter reaches a predetermined limit (which can in one example be three passes), and once the limit is reached a convergence test 96 is carried out which selects the appropriate deconvolution kernel and yields a restored object together with an estimated defocus.

A second alternative embodiment of the iterative restoration process 76 is shown in FIG. 8b. After object i 74 is obtained, a first restoration 79 is carried out with a kernel at $W_{20}=0$. The image metric is then calculated (80) and then a convergence test is carried out 82 to determine if the image metric is optimized, that is, whether the metric is within a predetermined level of a predetermined threshold. If the convergence test 82 yields a positive result (Y), the object i 74 is restored and an estimation of the defocus is achieved. If the convergence test 82 yields a negative result (N), a new estimate of the defocus parameter $W_{20}$ is calculated, 84, which is then used to modify the kernel of the restoration algorithm, 86. This loop is repeated until the convergence test 82 yields a positive result.

Figure 9:
FIG. 9 shows restored images of a first reference image for various deconvolution kernels.
Figure 9:
Figure 9:
Figure 9:
Figure 9:
Figure 9:
Figure 10:
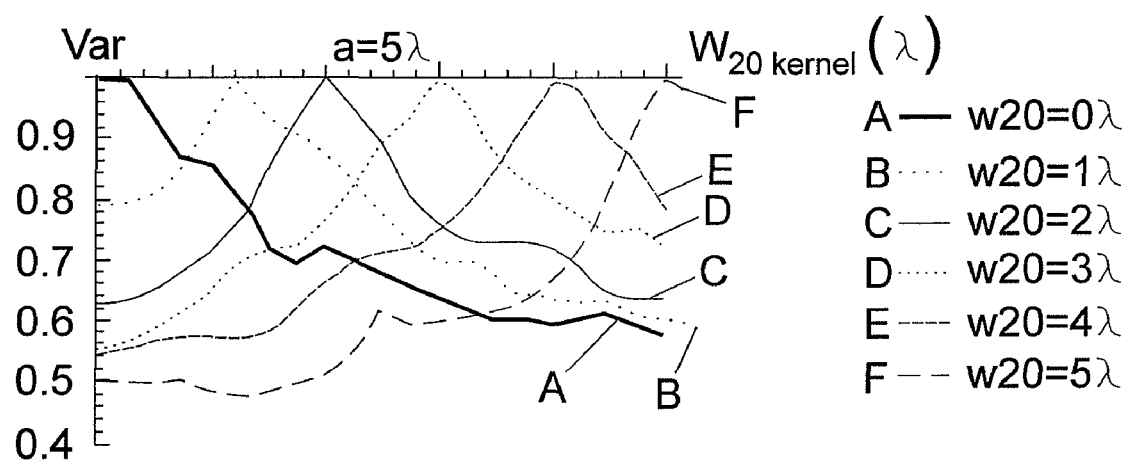
FIG. 10 shows the variance of the restored images of FIG. 9 as a function of a defocus parameter.

As mentioned above, one possible metric is the image contrast. One way of measuring the image contrast comprises rescaling the restored image between 0 and 1, and then calculating its variance. This metric takes advantage of the contrast loss in the restored and rescaled image due to the artifacts. It is maximized when the coding and decoding kernels are the same, i.e. when the effective optical transfer function inferred from the restored image features corresponds to that which would be achieved by an in-focus system in the absence of phase coding. This defocus estimation technique has been tested on several reference images. FIG. 9 shows this with respect to the well known Lena image, for a coding kernel having a defocus parameter of $W_{20}=3\lambda$, and where deconvolution kernels corresponding to $W_{20}$ of 0 to $5\lambda$ are shown, in order from left to right and top to bottom in the FIGURE. It can be appreciated that the restored image is free of defocus artifacts when the coding and decoding kernels are equal, and that the variance is maximized in this case, see FIG. 10, which shows the variance of the restored (and rescaled) image of Lena as a function of the defocus parameter $W_{20}$ kernel used in the deconvolution kernels. Phase encoding performed by a square aperture cubic phase mask with $\alpha=5\lambda$. The original defocus differs for each curve and goes from $W_{20}=0\lambda$ to $W_{20}=5\lambda$. Note the variance is maximized in each case when $W_{20\ kernel}=W_{20}$.

Figure 11:
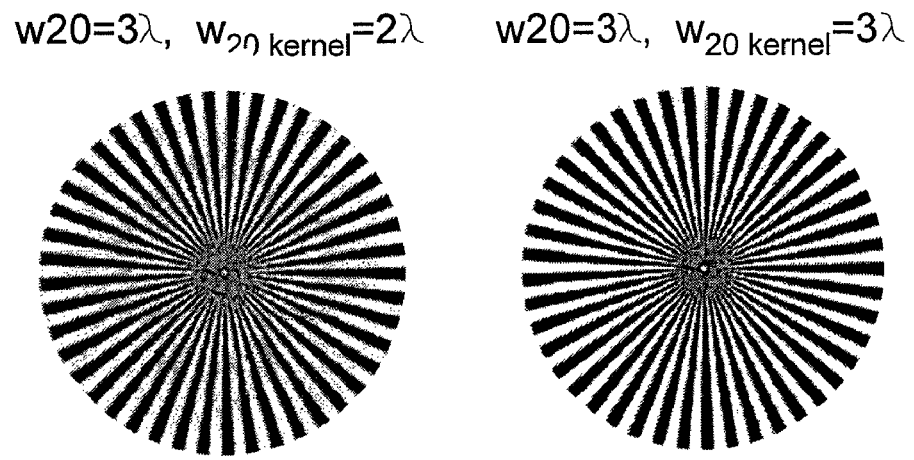
FIG. 11 shows restored images of a second reference image for different deconvolution kernels.
Figure 12:
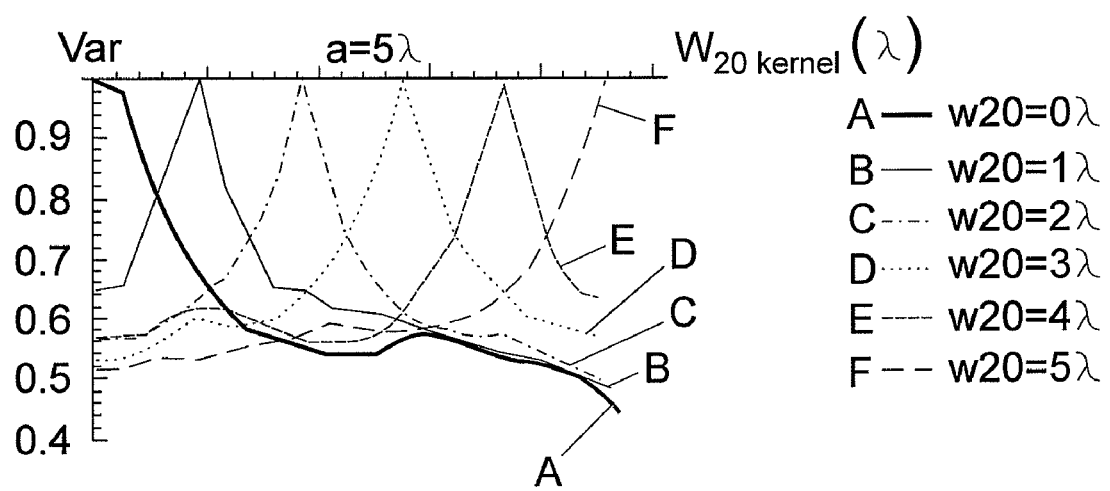
FIG. 12 shows the variance of the restored image of the second reference image as a function of the defocus parameter $W_{20}$ kernel used in the deconvolution kernels.
Figure 13:
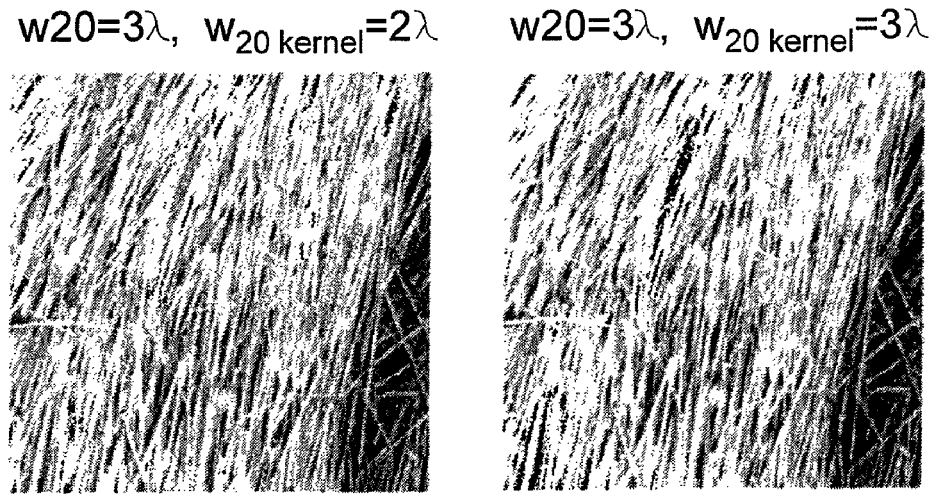
FIG. 13 shows restored images of a third reference image for different deconvolution kernels.
Figure 14:
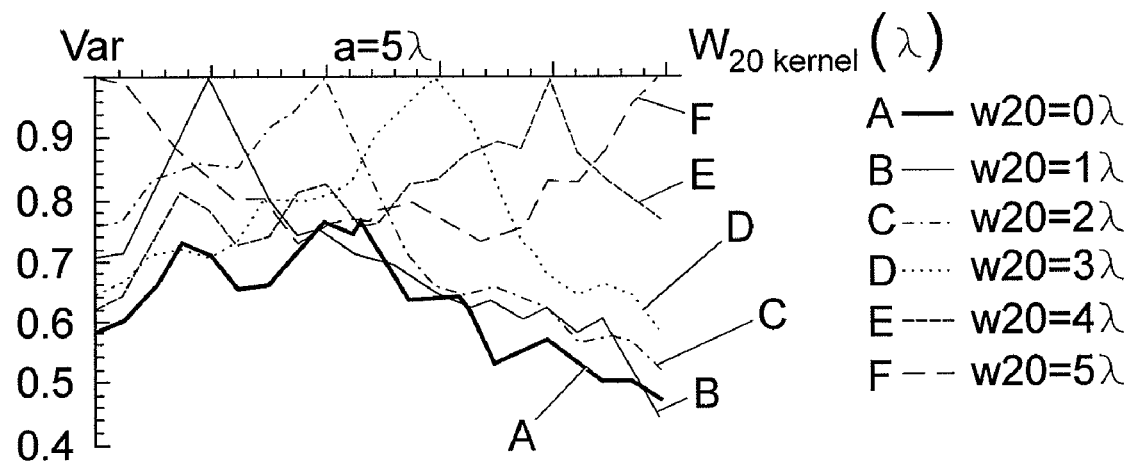
FIG. 14 shows the variance of the restored image of the third reference image of FIG. 13 as a function of the defocus parameter $W_{20\ kernel}$ used in the deconvolution kernels.

FIGS. 11 to 14 show that similar results are obtained with high contrast and highly textured images and demonstrate the feasibility of this technique for artifacts removal, specifically the spoke target in FIG. 11 and a grass scene in FIG. 13. Again, the variance of each restored (and rescaled) image as a function of the defocus parameter $W_{20}$ kernel used in the deconvolution kernels. Phase encoding performed by a square aperture cubic phase mask with $\alpha=5\lambda$. The original defocus differs for each curve and goes from $W_{20}=0\lambda$ to $W_{20}=5\lambda$. Note the variance is maximized when $W_{20}$ kernel=$W_{20}$.

This technique has a number of applications. As described above, it effectively applies an autofocus step after image capture. Also, it can be considered as a range finder since the distance of an image feature from the optical system can be deduced from the optical set up and the estimated defocus. Furthermore, with image segmentation, the technique also allows for processing post image capture in order to get every object of the image in focus.

Also, when lenses are manufactured, there is always a certain tolerance in the positioning of the lens in the camera module, which can for example be about 10 μm. This positional uncertainty detracts from the accuracy of focus in traditional imaging systems, but in a wavefront coded imaging system that has the iterative adjustment to the restoration algorithm as outlined above the amount of defocus that is introduced according to positional tolerance errors of the lens can be accounted for. This setting, unique to an individual camera module, can be stored for use by the image processing algorithms, for example it can be stored on a non-volatile memory portion of a coprocessor or even directly on the image processing chip. This then enables sharper image production, or enables the relaxation of tolerance standards to decrease the number of camera modules that are deemed to be defective.

Various improvements and modifications can be made to the above without departing from the scope of the invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of imaging an object, comprising:
performing a reconstruction algorithm on phase encoded image data to obtain an image in which the effects of phase perturbation are removed, wherein performing comprises:
estimating a degree of defocus in the obtained image;
adjusting the reconstruction algorithm to take account of the estimated degree of defocus; and
performing the adjusted reconstruction algorithm to obtain a restored image.

2. The method of claim 1, wherein adjusting the reconstruction algorithm comprises:
measuring an image metric of the obtained image;
using the image metric to estimate a new defocus parameter for the image reconstruction algorithm.

3. The method of claim 2, wherein using the image metric to estimate a new defocus parameter comprises performing an iterative analysis of images reconstructed with various defocus parameters, and choosing the defocus parameter that optimizes the image metric for obtaining the restored image.

4. The method of claim 3, wherein the image metric is contrast and wherein the degree of defocus is chosen as the value that maximizes the variance of the image contrast.

5. The method of claim 1, further comprising:
introducing a phase perturbation to get a phase-encoded image;
recording the phase encoded image data; and
after recording the phase encoded image data and prior to performing, segmenting the image into image features so that performing obtains the restored image for each segmented image feature, and further comprising combining restored images for the segmented image features to form a composite restored image.

6. The method of claim 5, wherein introducing a phase perturbation is performed with a phase mask that yields a focus invariant point-spread function, the phase mask being one of a cubic or petal phase mask.

7. The method of claim 5, wherein introducing a phase perturbation comprises performing wavefront coding.

8. The method of claim 5, wherein recording the phase encoded image data comprises detecting the image with a digital image sensor.

9. Apparatus, comprising:
a signal processing device for performing an image reconstruction algorithm to obtain an image in which the effects of phase perturbation are removed, the signal processing device executing an image reconstruction algorithm, wherein the algorithm functions to estimate a degree of defocus in a reconstructed phase encoded image, the signal processing device adjusting the image reconstruction algorithm that has been used to reconstruct the phase encoded image to take account of the estimated degree of defocus and perform the adjusted reconstruction algorithm to obtain a restored image.

10. The apparatus of claim 9, the signal processing device further functioning to measure an image metric of the obtained image; and use the image metric to estimate a new defocus parameter for the image reconstruction algorithm.

11. The apparatus of claim 10, the signal processing device further functioning to perform an iterative analysis of images reconstructed with various defocus parameters, and choose the defocus parameter that optimizes the image metric for obtaining the restored image.

12. The apparatus of claim 11, wherein the image metric is contrast and wherein the degree of defocus is chosen as the value that maximizes the variance of the image contrast.

13. The apparatus of claim 9, wherein the apparatus is formed as an integrated circuit or part thereof.

14. The apparatus of claim 9, wherein the apparatus is a computer program product executable on a computer for the performance of an image reconstruction algorithm.

15. The apparatus of claim 9, further comprising:
an optical system with phase encoding means; and
an image sensing means arranged to record the phase encoded image data.

16. The apparatus of claim 15, wherein said phase encoding means comprises one of a cubic or petal phase mask that yields a focus invariant point-spread function.

17. The apparatus of claim 16, wherein the phase encoding means comprises wavefront coding means.

18. The apparatus of claim 15, wherein the image sensing means comprises a digital image sensor.

19. The apparatus of claim 15, further comprising a memory for storing the estimated degree of defocus.

20. The apparatus of claim 19, wherein the memory comprises a non-volatile memory portion formed on a coprocessor or on an image sensing integrated circuit.

21. The apparatus of claim 15 wherein the optical system is a component within a mobile device.

22. The apparatus of claim 21, wherein the mobile device is one of a mobile telephone, laptop computer, webcam, digital still camera, camcorder, optical mouse or barcode reader.

23. A method, comprising:
receiving a phase encoded image object;
performing a restoration on the received phase encoded image object with a certain value of $W_{20}$;
calculating an image metric on the performed restoration;
repeating the steps of performing and calculating for a plurality of values of $W_{20}$;
performing convergence testing to determine which one of the plurality of values of $W_{20}$ optimizes the calculated image metric;
outputting the restored image object from the determined optimized value of $W_{20}$; and
outputting an estimated defocus of the phase encoded image object.

24. A method, comprising:
receiving a phase encoded image object;
performing a restoration on the received phase encoded image object with a certain value of $W_{20}$;
calculating an image metric on the performed restoration;
determining if the image metric is optimized, and if so:
outputting the restored image object from the determined optimized value of $W_{20}$; and
outputting an estimated defocus of the phase encoded image object; and otherwise:
repeating the steps of performing, calculating and determining for a different of value of $W_{20}$ until the image metric is optimized, and then:
outputting the restored image object from the determined optimized value of $W_{20}$; and
outputting an estimated defocus of the phase encoded image object.

25. Apparatus, comprising:
means for obtaining an image having effects of phase perturbation;
means for executing an image reconstruction algorithm on the obtained image to obtain a reconstructed phase encoded image;

means for estimating a degree of defocus in the reconstructed phase encoded image;
means for adjusting parameters of the image reconstruction algorithm used to reconstruct the phase encoded image so as to take into account the estimated degree of defocus; and means for re-executing image reconstruction algorithm using the adjusted parameters to obtain a restored image in which the effects of phase perturbation are substantially removed.

* * * * *